United States Patent [19]

Morgan

[11] 4,390,635

[45] Jun. 28, 1983

[54] ALKALI METAL ALUMINOBOROSILICATE PHOTOCHROMIC GLASSES

[75] Inventor: David W. Morgan, Corning, N.Y.

[73] Assignee: Corning Glass Works, Corning, N.Y.

[21] Appl. No.: 353,199

[22] Filed: Mar. 1, 1982

[51] Int. Cl.³ .......................... C03C 3/26; C03C 3/08
[52] U.S. Cl. ......................................... 501/13; 501/56
[58] Field of Search ................................... 501/13, 56

[56] References Cited

U.S. PATENT DOCUMENTS

| | | | |
|---|---|---|---|
| 3,208,860 | 9/1965 | Armistead | 501/13 |
| 3,252,374 | 5/1966 | Stookey | 501/13 |
| 3,306,833 | 2/1967 | O'Leary | 501/13 |
| 4,001,019 | 1/1977 | Yamashita et al. | 501/13 |
| 4,190,451 | 2/1980 | Hares et al. | 501/13 |
| 4,284,686 | 8/1981 | Wedding | 501/13 |

FOREIGN PATENT DOCUMENTS 724465  3/1980  U.S.S.R. ................................. 501/13

*Primary Examiner*—Mark Bell
*Attorney, Agent, or Firm*—C. S. Janes, Jr.

[57] ABSTRACT

This invention is directed to the production of transparent photochromic glasses containing silver halide crystals sensitized with copper having base compositions within the alkali metal aluminoborosilicate system wherein at least 0.025% $As_2O_3$ and/or $Sb_2O_3$ is present in the composition to insure that more than 50% of the copper is present in the $Cu^+$ state. Where an oxidizing agent is added to the composition, the amount of $As_2O_3$ and/or $Sb_2O_3$ will be increased to reduce that agent plus insure that more than 50% of the copper is present in the $Cu^+$ state.

2 Claims, No Drawings

ALKALI METAL ALUMINOBOROSILICATE PHOTOCHROMIC GLASSES

BACKGROUND OF THE INVENTION

Photochromic or phototropic glasses, as such have been variously termed, had their genesis in U.S. Pat. No. 3,208,860. That patent discloses the mechanism of photochromism as being dependent upon the presence of silver halide crystals in a silicate-based glass, i.e., crystals of silver chloride, silver bromide, and/or silver iodide in a matrix of a silicate glass. The patent teaches the preferred matrix glasses to have compositions within the alkali metal aluminoborosilicate system, viz, glasses consisting essentially, expressed in terms of weight percent on the oxide basis, of 4-26% $Al_2O_3$, 4-26% $B_2O_3$, 40-76% $SiO_2$, and at least one alkali metal oxide selected from the group of 2-8% $Li_2O$, 4-15% $Na_2O$, 6-20% $K_2O$, 8-25% $Rb_2O$, and 10-30% $Cs_2O$. Photochromic glasses having base compositions within the alkali metal aluminoborosilicate field have constituted by far the greatest number of products marketed commercially.

Although numerous other base glass compositions have been disclosed as suitable matrices for silver halide crystals to thereby produce articles exhibiting photochromic behavior, only those glasses encompassed within the alkali metal aluminophosphate system have enjoyed any commercial success. U.S. Pat. No. 3,876,436 broadly disclose such glasses and delineates preferred ranges thereof as consisting essentially, expressed in terms of weight percent on the oxide basis, of 60-80% $Al_2O_3 + SiO_2 + P_2O_5$, consisting of 20-34% $Al_2O_3$, 0-40% $SiO_2$, and 17-48% $P_2O_5$, wherein $P_2O_5$:$Al_2O_3$ is not less than 0.7, 0-19% $B_2O_3$, and at least 10% $Li_2O$ and/or $Na_2/O$ and/or $K_2O$.

Many subsequent patents have been granted involving relatively narrow ranges of base compositions within both the alkali metal aluminoborosilicate field and the alkali metal aluminophosphate system. These later patents cover compositions wherein the photochromic properties are improved and/or other physical and chemical characteristics of the glass are beneficially modified.

U.S. Pat. No. 4,190,451 is illustrative of the former field, disclosing glasses consisting essentially, expressed in terms of weight percent on the oxide basis, of 8-20% $Li_2O + Na_2O + K_2O + Cs_2O$ consisting of 0-2.5% $Li_2O$, 0-9% $Na_2O$, 0-17% $K_2O$, and 0-6% $Cs_2O$, 5-25% $Al_2O_3$, 14-23% $B_2O_3$, 0-25% $P_2O_5$, and 20-65% $SiO_2$. U.S. Pat. No. 4,092,174 is an example of the latter system, describing glasses consisting essentially, expressed in terms of weight percent on the oxide basis, of 7-20.5% $Li_2O + Na_2O + K_2O$, wherein the maximum content of $Li_2O$ is 5%, 13-36.5% $Al_2O_3$, 7-28% $B_2O_3$, 8.5-25% $SiO_2$, and 7.5-33.5% $P_2O_5$.

Experience has indicated that copper behaves as a sensitizing agent such that its presence is demanded to insure good photochromic properties in a silver-containing glass, i.e., the glass, when subjected to actinic radiation, customarily ultraviolet radiation, will quickly darken to a low luminous transmittance and, when removed from exposure to actinic radiation, will rapidly fade back toward its original transmittance. As utilized here, the expression luminous transmittance of a glass is defined as the value Y delineated in terms of the 1931 C.I.E. trichromatic colorimeter system employing the light source Illuminant C. This colorimetric system and light source are described by A. C. Hardy in the *Handbook of Colorimetry*, Technology Press, M.I.T., Cambridge, Mass. (1936). Experience has also demonstrated that a combination of silver chloride and silver bromide crystals normally imparts the most ideal photochromic character to the glass. Therefore, the workers in the field of silver halide-containing photochromic glass have defined the necessary "photochromic elements" as silver, chloride, bromide, and copper expressed as CuO.

Unfortunately, the chemical durability of alkali metal aluminophosphate glasses is not as great as that of glasses in the alkali metal aluminoborosilicate field. This deficiency has been especially vexing in the finishing and cleaning of ophthalmic lenses by lens manufacturers. Moreover, the mechanical strength of the former glasses, even after chemical strengthening, is less than that of the silicate glasses. Those two factors have been mainly responsible for the greater commercial use of alkali metal aluminoborosilicate base compositions as matrices for silver halide crystal-containing photochromic glasses.

As is explained in U.S. Pat. No. 4,190,451, the content of CuO in the glass is critical to not only induce photochromic behavior therein, but also to impart relative temperature independence to the glass, i.e., the photochromic character of the glass does not change drastically with variations in ambient temperature. Thus, excessive amounts of CuO cause a reduction in the darkening capability of a glass at room temperature and higher, and also effect increased darkening when exposed to actinic radiation at low temperatures. Accordingly, for each glass composition, a delicate balance in CuO content is required to be struck to achieve desirable photochromic properties. Maintaining this balance is a very difficult problem from a practical point of view since the amount of CuO used is so small, a minimum of about 0.005%, but generally less than 0.03%, and commonly less than 0.015%. Greater quantities adversely affect the overall photochromic properties plus impart a permanent coloration in the glass.

Electron paramagnetic resonance (EPR) studies have indicated that it is the $Cu^+$ ion that performs as a sensitizer to thereby confer photochromic behavior to the glass. Thus, the photochromic mechanism operating in alkali metal aluminoborosilicate base glasses is dependent upon moving the $Cu^+$-$Cu^{+2}$ equilibrium toward $Cu^+$ to a sufficient extent that there are adequate $Cu^+$ ions available to cause glass darkening. EPR examinations have demonstrated that more than one-half and, preferably, at least two-thirds of the copper will be available in the $Cu^+$ state. This circumstance would augur the use of a reducing agent in the glass.

U.S. Pat. No. 3,208,860 suggests the use of a reducing agent in an amount sufficient to convert silver ions to metallic silver atoms. Unfortunately, however, extensive reduction leads to the generation of a permanent amber coloration in the glass as a result of the presence of colloidal silver particles therein. Therefore, the primary objective of the subject invention is to insure that more than one-half of the copper is present in the $Cu^+$ state in a silver halide-containing, alkali metal aluminoborosilicate glass to achieve good photochromic properties therein, but excessive amounts of colloidal silver are not present.

The oxidation state of the copper is important in permitting adjustments to be made in other components of the glass and in glass melting and forming practices.

For example, higher alkali metal contents can be tolerated in the glass composition, that feature frequently increasing the fading rate of the glass, while maintaining the darkening capability thereof. Further, the substantial presence of $Cu^+$ ions enables the glass to be melted at lower temperatures with no adverse effect upon the photochromic behavior exhibited thereby. The concern regarding the oxidation state of the copper becomes especially critical, however, when highly oxidizing materials, such as the colorants $Cr_2O_3$, $MnO_2$, $CeO_2$, and $V_2O_5$, are incorporated into the composition. For example, whereas the $Cr^{+3}$ ion is well-recognized as producing a deep, high purity green coloration to a glass, its utility in the commercially-marketed alkali metal aluminosilicate photochromic glasses has been limited because it adversely affects the photochromic mechanism. EPR studies indicated that, as chromium is added to the commercial glass, the equilibrium $Cu^+$-$Cu^{+2}$ is shifted significantly toward $Cu^{+2}$. This shift dramatically decreases the photochromic behavior of the glass. Accordingly, a second major objective of the instant invention is to provide means for coping with the inclusion of highly oxidizing ions in the glass while maintaining desirable photochromic performance.

SUMMARY OF THE INVENTION

I have found that the above objectives can be accomplished through the incorporation of a critically-defined amount of arsenic and/or antimony (expressed as $As_2O_3$ and $Sb_2O_3$, respectively) into a copper-sensitized, silver halide-containing alkali metal aluminoborosilicate photochromic glass. Thus, I have determined that, where about 0.004–0.03% copper, expressed as CuO, is present in the glass, the inclusion of about 0.025% $As_2O_3$ and/or $Sb_2O_3$, as analyzed in the glass, will normally act to insure that more than 50% of the copper will exist as $Cu^+$ ions, where no highly oxidizing component has been included therein. No substantive advantage has been found in utilizing significantly larger amounts so 0.25% by weight has been considered to be a practical maximum. Where a highly oxidizing constituent, such as chromium oxide, is incorporated into the glass, the minimum quantity of $As_2O_3$ and/or $Sb_2O_3$ required to maintain the majority of copper in the $Cu^+$ state will be dependent upon the amount of the oxidizing ingredient included.

To illustrate, as little as about 0.03% by weight of chromium oxide, expressed as $Cr_2O_3$, imparts a light green coloration to the glass and 0.1% by weight produces a deep, highly pure green coloration. Additional $Cr_2O_3$ does not substantially enhance the coloration provided and hazards the need for adjusting the base glass to maintain the desired overall properties therein. Consequently, 0.25% by weight $Cr_2O_3$ has been deemed to comprise a practical maximum.

In general, a minimum of 0.05% $As_2O_3$ and/or $Sb_2O_3$, as analyzed, has been considered required where 0.03% $Cr_2O_3$ has been included in the glass composition. EPR studies have indicated that arsenic and/or antimony reduce the chromium from the $Cr^{+5}$ and $Cr^{+6}$ state to the $Cr^{+3}$ state prior to acting upon the $Cu^{+2}$ ions. Nevertheless, once essentially all of the chromium is present in the $Cr^{+3}$ state (yielding the desired green coloration), a small increase in $As_2O_3$ and/or $Sb_2O_3$ content reduces the $Cu^{+2}$ ions to $Cu^+$. Additional quantities of $As_2O_3$ and/or $Sb_2O_3$ have no immediate effect until so much is present that the silver ions (or other readily-reducible metal ions such as lead ions) are affected and/or the overall properties of the glass are substantively modified. In light of that factor, 0.3% by weight $As_2O_3$ and/or $Sb_2O_3$, as analyzed in the glass, has been deemed a practical maximum where up to 0.25% $Cr_2O_3$ is present. Typically, where a substantial level of a highly oxidizing agent is present, $As_2O_3$ and/or $Sb_2O_3$ will not exceed a value about 50% greater than that of the oxidizing agent. This feature permits $As_2O_3$ and/or $Sb_2O_3$ to act as a buffer, but care must be undertaken to avoid extensive reduction of the silver ions to metallic silver.

I have found that the inclusion of about 0.025% $As_2O_3$ and/or $Sb_2O_3$, as analyzed in a glass containing about 0.004–0.03% CuO, in order to effect the reduction of $Cu^{+2}$ ions, such that over 50% of the copper will be present as $Cu^+$ ions, is operable in the alkali metal aluminoborosilicate compositions disclosed in U.S. Pat. No. 3,208,860, supra, with the most preferred glasses being generally delineated in U.S. Pat. No. 4,190,451, supra.

Accordingly, my invention is operable with transparent base glasses consisting essentially, as analyzed in weight percent on the oxide basis, of 4–26% $Al_2O_3$, 4–26% $B_2O_3$, 40–76% $SiO_2$, at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$, at least one halogen in the indicated minimum effective proportion of 0.2% chlorine, 0.1% bromine, and 0.08% iodine, and a minimum of silver in the indicated proportion of 0.2% in a glass wherein the effective halogen consists of chlorine, 0.05% in a glass containing at least 0.1% bromine but containing less than 0.08% iodine, and 0.03% in a glass which contains at least 0.08% iodine, the sum of the recited base glass constituents, silver, and halogens being at least 85% of the total glass composition, 0.004–0.03% CuO, and at least 0.025% $As_2O_3$ and/or $Sb_2O_3$.

Superior photochromic properties are secured within the narrow range of transparent base glasses which consist essentially, expressed in terms of weight percent on the oxide basis, of 0–2.5% $Li_2O$, 0–9% $Na_2O$, 0–17% $K_2O$, and 0–8% $Cs_2O$, the sum of $Li_2O+Na_2O+K_2O+Cs_2O$ being 8–20%, 5–25% $Al_2O_3$, 14–23% $B_2O_3$, 40–65% $SiO_2$, 0.004–0.02% CuO, at least 0.025% $As_2O_3$ and/or $Sb_2O_3$, 0.15–0.3% Ag, 0.1–0.25% Cl, and 0.1–0.2% Br, the molar ratio of alkali metal oxide:$B_2O_3$ ranging between about 0.55–0.85, where the composition is essentially free from divalent metal oxides other than CuO, and the weight ratio Ag:(Cl+Br) ranges about 0.65–0.95. Where desired, up to 10% total of the following components may be added to the base composition in the indicated proportions of up to 6% $ZrO_2$, up to 3% $TiO_2$, up to 1.0% PbO, up to 7% BaO, up to 4% CaO, up to 3% MgO, up to 6% $Nb_2O_5$, up to 4% $La_2O_3$, and up to 2% F; and up to 1% total of transition metal oxides and/or up to 5% total of rare earth metal oxides as colorants.

U.K. patent application No. 2,059,943A discloses the production of silver halide-containing photochromic glasses exhibiting a green coloration having statedly aluminophosphate base compositions which are defined as falling within the following ranges, expressed in terms of weight percent on the oxide basis, of

| | |
|---|---|
| $SiO_2$ | 8.5–25 |
| $Al_2O_3$ | 13–36.5 |

-continued

| | |
|---|---|
| $P_2O_5$ | 7.5-33.5 |
| $B_2O_3$ | 7-28 |
| $Li_2O$ | 0-5 |
| $Li_2O$ and/or $Na_2O$ and/or $K_2O$ | 7-20.5 |
| $Ag_2O$ | not less than 0.05 |
| Cl + Br | 0.2-2 |

The green coloration is produced through the addition of up to 0.45% by weight $Cr_2O_3$ and up to 1% by weight $As_2O_3$ and/or $Sb_2O_3$. Not only are those base compositions different from the silicate glasses to which my invention is directed but also there is no teaching regarding the need for copper as a sensitizer, much less the requirements that the glass contain 0.004–0.03% by weight CuO and that the majority of the copper must be present in the $Cu^+$ state. CuO is tabulated in the working examples but in amounts in excess of 0.03%. Furthermore, the permitted additions of $Cr_2O_3$ and $As_2O_3$ and/or $Sb_2O_3$ are far in excess of the maxima cited in the present invention compositions.

Batches for the exemplary compositions 1–12 were compounded and melted in a small continuous glass melting unit equipped with a mechanical stirrer operating at about 1450° C. The molten glass was delivered to a press wherein lens blanks having a diameter of 70 mm were formed. The lens blanks were immediately transferred to a lehr operating at temperatures about 30° C. below the annealing temperature of each glass. Photochromic behavior was developed in the blanks through heat treatment of about one-half hour at temperatures between about 640°–660° C. The loss of $As_2O_3$ and/or $Sb_2O_3$ via volatilization during melting will average about 10%.

Batches for exemplary compositions 13–17 were compounded, the ingredients ballmilled together, and placed into platinum crucibles. The crucibles were covered, introduced into a furnace operating at 1450° C., and the batches were melted for three hours with stirring. A slab having dimensions of about $10'' \times 4'' \times \frac{1}{2}''$ was formed by pouring the melt into a steel mold, and the slab immediately transferred to an annealer operating at about 375° C.

TABLE I

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $SiO_2$ | 56.6 | 56.5 | 56.5 | 56.5 | 56.5 | 56.5 | 56.5 | 56.5 | 56.6 | 56.5 | 56.6 | 56.5 | 56.4 | 56.5 | 56.7 | 56.6 | 56.4 |
| $B_2O_3$ | 18.2 | 18.2 | 18.1 | 18.1 | 18.1 | 18.1 | 18.1 | 18.1 | 18.2 | 18.1 | 18.2 | 18.1 | 18.1 | 18.1 | 18.2 | 18.2 | 18.1 |
| $Al_2O_3$ | 6.22 | 6.21 | 6.21 | 6.20 | 6.21 | 6.20 | 6.20 | 6.20 | 6.21 | 6.20 | 6.19 | 6.19 | 6.19 | 6.20 | 6.21 | 6.20 | 6.19 |
| $Li_2O$ | 1.82 | 1.82 | 1.82 | 1.82 | 1.82 | 1.82 | 1.82 | 1.82 | 1.82 | 1.82 | 1.82 | 1.82 | 1.82 | 1.82 | 1.82 | 1.82 | 1.81 |
| $Na_2O$ | 5.55 | 5.54 | 5.54 | 5.53 | 5.54 | 5.53 | 5.53 | 5.53 | 5.53 | 5.53 | 5.53 | 5.53 | 5.52 | 5.54 | 5.54 | 5.53 | 5.52 |
| $K_2O$ | 5.75 | 5.74 | 5.73 | 5.73 | 5.73 | 5.73 | 5.73 | 5.73 | 5.74 | 5.74 | 5.74 | 5.72 | 5.72 | 5.72 | 5.74 | 5.74 | 5.73 |
| $ZrO_2$ | 5.02 | 5.00 | 5.00 | 4.99 | 5.00 | 4.99 | 4.99 | 4.99 | 5.00 | 4.99 | 5.00 | 4.99 | 4.99 | 4.99 | 5.01 | 5.00 | 4.99 |
| $TiO_2$ | 2.27 | 2.27 | 2.27 | 2.27 | 2.27 | 2.27 | 2.27 | 2.27 | 2.27 | 2.27 | 2.27 | 2.26 | 2.26 | 2.26 | 2.27 | 2.27 | 2.27 |
| Ag | 0.212 | 0.211 | 0.207 | 0.207 | 0.207 | 0.219 | 0.219 | 0.219 | 0.220 | 0.220 | 0.220 | 0.220 | 0.219 | 0.219 | 0.24 | 0.239 | 0.239 |
| CuO | 0.007 | 0.007 | 0.003 | 0.022 | 0.008 | 0.003 | 0.007 | 0.006 | 0.016 | 0.082 | 0.055 | 0.007 | 0.007 | 0.007 | 0.008 | 0.008 | 0.008 |
| Cl | 0.228 | 0.227 | 0.227 | 0.227 | 0.227 | 0.221 | 0.221 | 0.221 | 0.221 | 0.221 | 0.221 | 0.221 | 0.220 | 0.221 | 0.257 | 0.256 | 0.256 |
| Br | 0.162 | 0.161 | 0.167 | 0.169 | 0.169 | 0.169 | 0.169 | 0.169 | 0.162 | 0.161 | 0.161 | 0.161 | 0.161 | 0.161 | 0.176 | 0.176 | 0.176 |
| $Cr_2O_3$ | 0.009 | 0.098 | 0.043 | 0.041 | 0.041 | 0.083 | 0.083 | 0.083 | 0.041 | 0.041 | 0.041 | 0.062 | — | — | — | 0.08 | 0.08 |
| $Sb_2O_3$ | — | — | 0.103 | 0.099 | 0.099 | 0.099 | 0.099 | 0.099 | — | — | — | 0.099 | — | 0.15 | — | — | — |
| NiO | | | | | | | | | | | | 0.039 | — | — | — | — | — |
| CoO | | | | | | | | | | | | 0.008 | — | — | — | — | — |
| $As_2O_3$ | | | | | | | | | | | | — | — | — | — | — | 0.20 |

DESCRIPTION OF PREFERRED EMBODIMENTS

Table I reports several glass compositions, expressed in terms of parts by weight on the oxide basis, illustrative of the compositional parameters of the instant inventive glasses. Inasmuch as it is not known with which cation(s) the halides are combined, they are merely tabulated as chloride and bromide, in accordance with conventional glass analysis. Because the quantities of silver are so small, they likewise are recorded on an elemental basis. Since the sum of the individual constituents closely approximates 100, for all practical purposes the values recited may be deemed to reflect weight percent. The batch ingredients may be any materials, either the oxides or other compounds, which, when melted together, will be transformed into the desired oxide in the proper proportions.

Color and photochromic properties were determined utilizing a conventional tristimulus colorimeter and laboratory exposure/photometer system. Each lens blank was ground and polished to a thickness of about 2 mm and samples from the slabs of Examples 13–17 were also ground and polished in similar fashion. The specimens were exposed to a source of ultraviolet radiation for about 10 minutes at room temperature ($\sim 20°$-$25°$ C.) and thereafter removed from the radiation for about 5 minutes. Table II reports the luminous transmittances demonstrated by each specimen before darkening ($T_0$), after darkening for 10 minutes ($T_{D10}$), after fading for 5 minutes ($T_{F5}$), and the amount of fading from the darkened state after 5 minutes ($T_{F5}$-$T_{D10}$). Table II also records the chromaticity coordinates (x,y) of the undarkened ($T_0$), the darkened ($T_{D10}$), and the faded ($T_{F5}$) samples.

TABLE II

| | | | | | $T_0$ | | $T_{D10}$ | | $T_{F5}$ | |
|---|---|---|---|---|---|---|---|---|---|---|
| Example | $T_0$ | $T_{D10}$ | $T_{F5}$ | $T_{Ff}$-$T_{D10}$ | x | y | x | y | x | y |
| 1 | 86.3 | 60.0 | 55.0 | 5.0 | 0.3140 | 0.3298 | 0.3152 | 0.3287 | 0.3176 | 0.3253 |
| 2 | 73.3 | 66.6 | 67.4 | 0.8 | 0.3356 | 0.3749 | 0.3469 | 0.3967 | 0.3470 | 0.3967 |
| 3 | 68.5 | 36.5 | 51.3 | 14.4 | 0.3117 | 0.3528 | 0.3176 | 0.3500 | 0.3184 | 0.3505 |
| 4 | 81.6 | 69.7 | 80.3 | 10.5 | 0.3142 | 0.3401 | 0.3186 | 0.3407 | 0.3158 | 0.3411 |
| 5 | 81.9 | 39.3 | 68.8 | 29.5 | 0.3127 | 0.3350 | 0.3180 | 0.3322 | 0.3176 | 0.3358 |
| 6 | 68.5 | 36.5 | 51.3 | 14.4 | 0.3178 | 0.3528 | 0.3176 | 0.3499 | 0.3184 | 0.3505 |
| 7 | 67.1 | 34.3 | 60.1 | 25.8 | 0.3203 | 0.3499 | 0.3178 | 0.3475 | 0.3178 | 0.3512 |
| 8 | 68.0 | 32.1 | 56.0 | 23.9 | 0.3144 | 0.3537 | 0.3181 | 0.3482 | 0.3201 | 0.3474 |

TABLE II-continued

| Example | $T_0$ | $T_{D10}$ | $T_{F5}$ | $T_{Ff} - T_{D10}$ | $T_0$ x | $T_0$ y | $T_{D10}$ x | $T_{D10}$ y | $T_{F5}$ x | $T_{F5}$ y |
|---|---|---|---|---|---|---|---|---|---|---|
| 9  | 80.9 | 69.2 | 71.3 | 2.1  | 0.3279 | 0.3621 | 0.3310 | 0.3626 | 0.3313 | 0.3627 |
| 10 | 69.9 | 58.4 | 63.3 | 4.9  | 0.3059 | 0.3426 | 0.3076 | 0.3417 | 0.3101 | 0.3423 |
| 11 | 71.4 | 43.7 | 60.5 | 16.8 | 0.3109 | 0.3460 | 0.3120 | 0.3431 | 0.3196 | 0.3456 |
| 12 | 67.9 | 31.1 | 55.5 | 24.4 | 0.3168 | 0.3508 | 0.3237 | 0.3480 | 0.3239 | 0.3523 |
| 13 | 90.1 | 41.0 | 71.4 | 30.4 | 0.3114 | 0.3229 | 0.3171 | 0.3208 | 0.3181 | 0.3240 |
| 14 | 90.4 | 39.4 | 73.5 | 34.2 | 0.3125 | 0.3238 | 0.3250 | 0.3233 | 0.3188 | 0.3252 |
| 15 | 88.5 | 35.3 | 68.4 | 33.1 | 0.3125 | 0.3245 | 0.3257 | 0.3241 | 0.3207 | 0.3246 |
| 16 | 73.3 | 72.1 | 72.2 | 1.1  | 0.3463 | 0.3987 | 0.3479 | 0.3984 | 0.3477 | 0.3983 |
| 17 | 73.0 | 34.6 | 49.8 | 15.2 | 0.3122 | 0.3479 | 0.3197 | 0.3460 | 0.3219 | 0.3476 |

When Tables I and II are studied together, the advantageous effect which $As_2O_3$ and/or $Sb_2O_3$ has upon the photochromic performance manifested in alkali metal aluminoborosilicate base glasses containing silver halide crystals and copper as a sensitizer becomes clearly evident from a comparison of Examples 13 and 14.

The utility of $As_2O_3$ and/or $Sb_2O_3$ additions to glasses containing highly oxidizing agents is especially evident when the photochromic behavior of Examples 2 and 9–11 are compared with that demonstrated by Examples 3–8 and 12, and that of Example 16 with that of Example 17. As was observed above and is apparent from Tables I and II, $As_2O_3$ and/or $Sb_2O_3$ may be present in the glass in amounts somewhat in excess of that demanded to insure that the majority of the copper is present in the $Cu^+$ state, but care must be exercised to avoid reducing any substantial portion of the silver ions to colloidal silver.

The most preferred composition for color as well as photochromic properties is Example 12. Very minor amounts of the known colorants NiO and CoO (non-oxidizing agents) were added to achieve a very particular hue of green.

I claim:

1. A green transparent photochromic glass wherein crystals of silver chloride and silver bromide sensitized with copper impart the photochromic behavior to the glass and wherein over 50% of the copper is present as $Cu^+$ ions, said glass consisting essentially, expressed in terms of weight percent on the oxide basis, of 0–2.5% $Li_2O$, 0–9% $Na_2O$, 0–17% $K_2O$, and 0–8% $Cs_2O$, the sum of $Li_2O+Na_2O+K_2O+Cs_2O$ being 8–20%, 5–25% $Al_2O_3$, 14–23% $B_2O_3$, 40–65% $SiO_2$, 0.004–0.02% CuO, 0.15–0.3% Ag, 0.1–0.25% Cl, 0.1–0.2% Br, the molar ratio alkali metal oxide:$B_2O_3$ ranging between about 0.55–0.85, where the composition is essentially free from divalent metal oxides other than CuO, the weight ratio Ag:(Cl+Br) ranging between about 0.65–0.95, about 0.03–0.25% $Cr_2O_3$, and about 0.05–0.3% $As_2O_3$ and/or $Sb_2O_3$, as analyzed in the glass.

2. A green transparent photochromic glass according to claim 1 wherein said glass composition also contains up to 10% total of the following components in the indicated proportion of up to 6% $ZrO_2$, up to 3% $TiO_2$, up to 1.0% PbO, up to 7% BaO, up to 4% CaO, up to 3% MgO, up to 6% $Nb_2O_5$, up to 4% $La_2O_3$, and up to 2% F; and up to 1% total of non-oxidizing transition metal oxides and/or up to 5% total of non-oxidizing rare earth metal oxides.

* * * * *